United States Patent
Lamprecht et al.

[11] 3,800,355
[45] Apr. 2, 1974

[54] HEADLAMP WIPER SYSTEMS

[76] Inventors: Rudolf Lamprecht, Lubecker Strasse 4; Lothar Reck, Hessenvig 3, both of 609 Russelsheim, Germany

[22] Filed: May 1, 1972

[21] Appl. No.: 249,345

[30] Foreign Application Priority Data
May 6, 1971 Germany.......................... 7117683

[52] U.S. Cl.......... 15/250.22, 15/250.24, 15/250.27
[51] Int. Cl............................. B60s 1/20, B60s 1/44
[58] Field of Search....... 15/250.22, 250.24, 250.25, 15/250.27

[56] References Cited
UNITED STATES PATENTS
1,599,272  9/1926  Belliveau ......................... 15/250.24
2,334,508  11/1943  Purden.............................. 15/250
3,058,142  10/1962  Pollock ........................... 15/250.02
3,704,481  12/1972  Fennell ........................... 15/250.01

FOREIGN PATENTS OR APPLICATIONS
1,204,276  9/1970  Great Britain .................. 15/250.22

Primary Examiner—Peter Feldman
Attorney, Agent, or Firm—W. A. Schuetz

[57] ABSTRACT

A headlamp wiper system in which an annular drive pulley mounted for rotation on a retainer around the rim of a headlamp is driven by an endless cable. The annular pulley carries a wiper which engages the lens of the headlamp. One cable may be used to drive the annular pulleys of two or more headlamps, or drive arrangements utilizing two or three cables may be used.

7 Claims, 14 Drawing Figures

PATENTED APR 2 1974 3,800,355
SHEET 1 OF 5
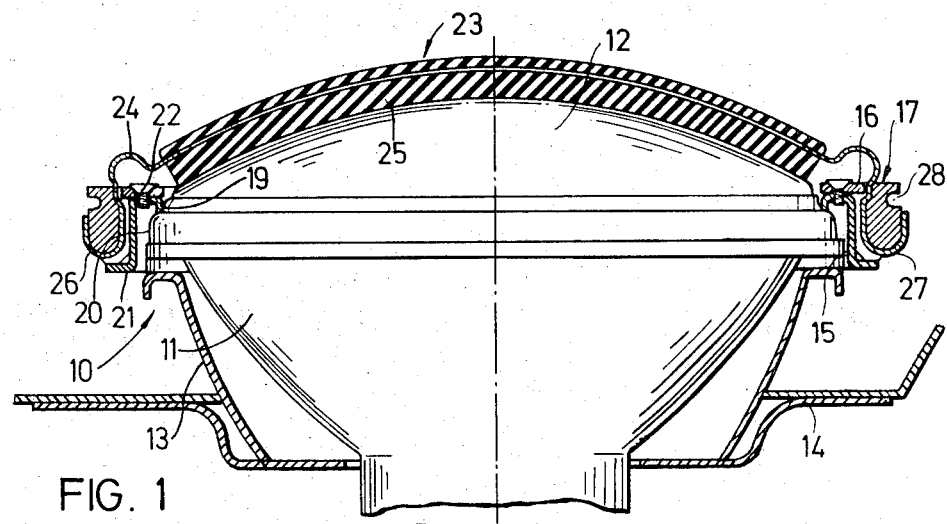
FIG. 1
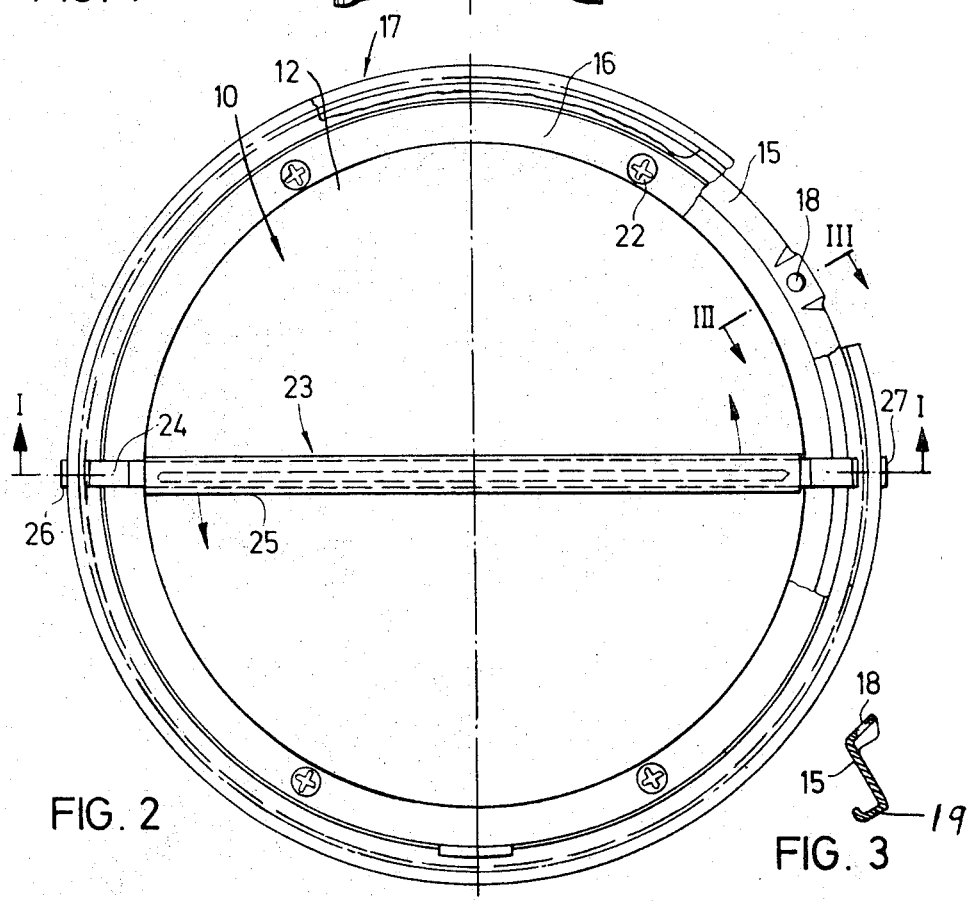
FIG. 2
FIG. 3

HEADLAMP WIPER SYSTEMS

This invention relates to headlamp wiper systems for use on motor vehicles.

A headlamp wiper system according to the invention can readily be fitted to a vehicle and is adaptable to suit any desired number or configuration of headlamps on the vehicle. The system provides a robust and economical assembly well adapted for mass produced motor vehicles.

The appended claims define the scope of the invention claimed. How the invention can be performed is hereinafter particularly described with reference to the accompanying drawings, in which:

FIG. 1 is a part-sectioned longitudinal view along the line 1—1 of FIG. 2 of a headlamp with a wiper system according to the invention;

FIG. 2 is a plan view of the headlamp of FIG. 1;

FIG. 3 is a section along the line III—III of FIGS. 2 and 5 respectively;

Figure 4:
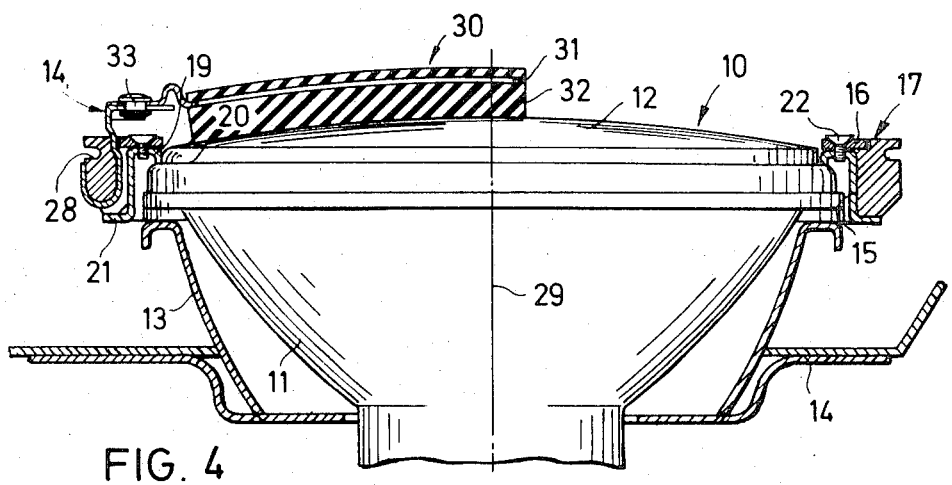
FIG. 4 is a view similar to FIG. 1, but taken along the line IV—IV of FIG. 5, and showing another form of wiper.

FIG. 1 is a part-sectioned longitudinal elevation view along the line I—I of FIG. 2 of a motor vehicle headlamp 10 having a reflector 11, a diffuser lens 12 and a housing 13. The housing 13 is secured to sheet-metal panelling 14 of the motor vehicle body by means (not shown) which form no part of the invention. The headlamp 10 is secured in its housing 13 by engagement with a two-part ring or bezel 15, 16 which acts also as an annular retainer or guide ring for an annular drive pulley 17. The retainer 15, 16 surrounds and engages the rim of the headlamp 10. The retainer as best seen in FIG. 3 has a generally S-shaped portion 15, and this is secured at its rearward face 21 by screws (which are received in three spaced apart apertures 18 (FIGS. 2,3 and 5) therein and enter suitable apertures (not shown) in the body panelling. The portion 15 has a forward face 19 which seats on a rim or collar 20 of the headlamp 10 and thus retains the headlamp in its housing 13. The face 21 constitutes one limb of a "U" whose other opposed face is formed by an annulus forming the other part 16 of the retainer. The two parts 15, 16 of the retainer are secured to one another by screws 22 (FIGS. 1 and 4). The parts 15,16 form a guide in which an annular drive pulley 17 is journalled for rotation around the retainer, and the pulley 17 bears against both opposed faces of the retainer. The parts 15, 16 are screwed together after the pulley 17 has been placed on the part 15.

As shown in FIGS. 1 and 2 a wiper 23 is secured to the annular drive pulley 17. The wiper comprises a leaf spring 24 shaped to conform to the curvature of the lens 12 and a wiper blade 25 of rubber or like material bonded to the spring. The spring 24 has hook-like ends 26, 27 which embrace the annular drive pulley 17. The pulley 17 is preferably made from a suitable plastics material, and has a groove 28 in its outer periphery in which a drive cable can fit.

Figure 5:
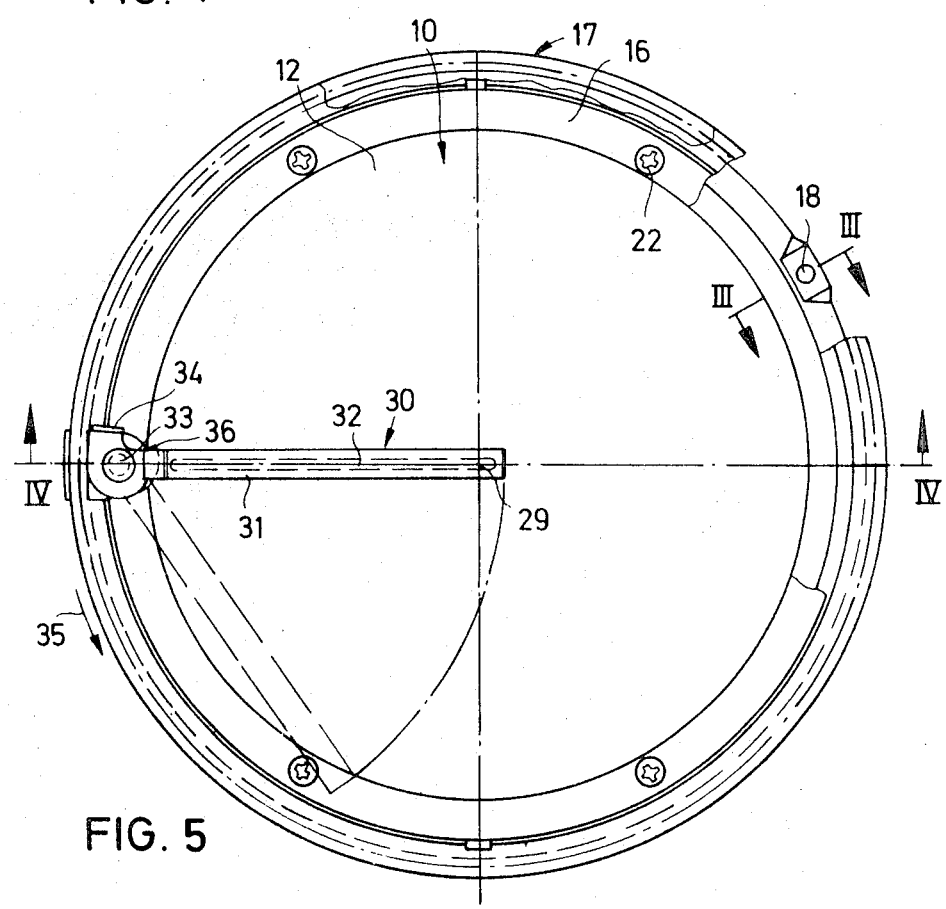
FIG. 5 is a plan view of the headlamp of FIG. 4.

FIGS. 4 and 5 differ from FIGS. 1 and 2 in that they show another form of wiper. The wiper shown in FIGS. 4 and 5 and denoted by the reference numeral 30 is disposed radially of the lens. The wiper 30 has a leaf spring 31 curved to conform to the curvature of the headlamp lens, and a wiper blade 32 of rubber or like material bonded to the spring. The wiper extends radially just over halfway across the lens 10.

The leaf spring 31 has an extension connected to it adjacent one end by a hinged joint 33. The extension is secured to the annular pulley 17. The hinged joint 33 permits the wiper to swivel from the wiping position shown in full lines in FIG. 5 to a park position shown in dot-dash lines in FIG. 5. In this park position the wiper lies at the edge of the lens and does not interfere with the light from the headlamp. When the wiper is energized the friction force between the wiper blade and the lens ($\mu$ x application pressure) and the force exerted by the rotation of the pulley (in the direction of the arrow 35 in FIG. 5) combine to produce a turning force which acts on the wiper at the joint 33 and causes the wiper to pivot and swing away from the direction of movement of the pulley 17 so that the blade moves towards the centre of the lens. The wiper is held radially of the lens by a stop 34, and the wiper then rotates as one with the pulley 17. Reversal of the direction of rotation of the pulley 17 causes the wiper to pivot about the joint 33 and the blade swings back to the edge of the lens and engages a stop 36 which thus limits the swing of the wiper blade out of its radial operative position. Until drive to the pulley ceases the wiper is dragged around the edge of the lens in a parked position. Preferably the annular pulley is cable driven from a driven pulley energized by an electric motor (not shown), and the direction of rotation can conveniently be reversed by reversing the polarity of the motor. A time switch (also not shown) controls the duration of reverse motion of the motor.

Figure 6:
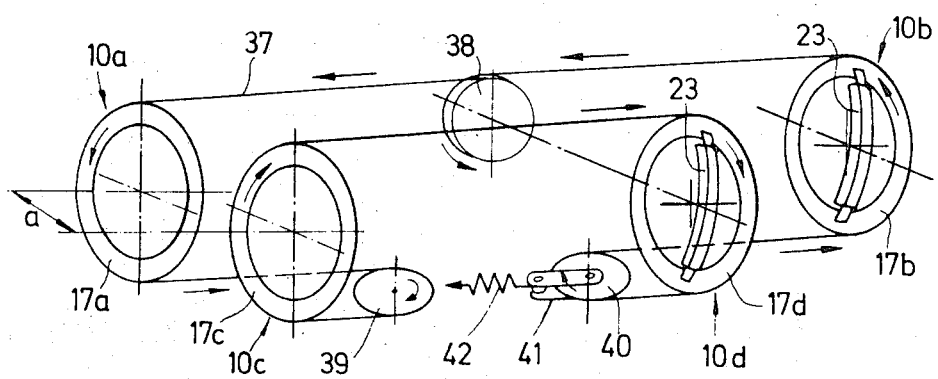
FIG. 6 shows one arrangement of cable drive for a headlamp wiper system according to the invention and including four headlamps.
Figure 7:
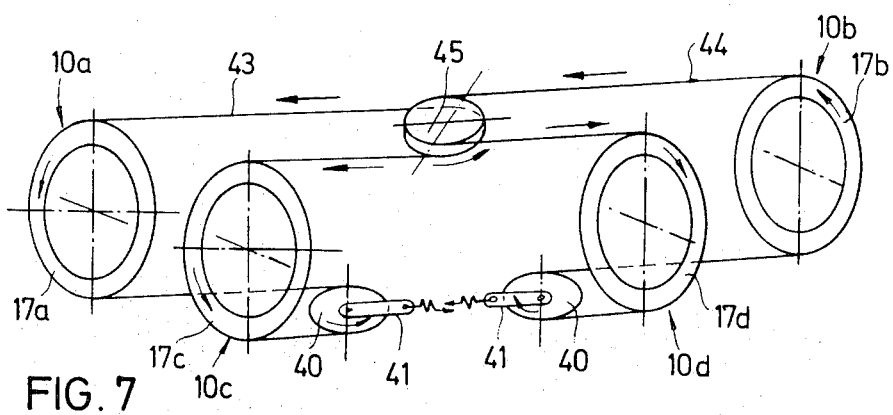
FIG. 7 is a view similar to FIG. 6 but showing a drive arrangement having two endless cables.
Figure 8:
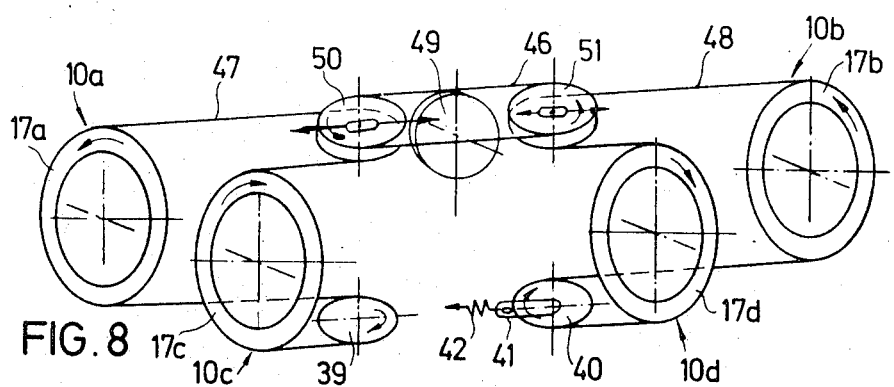
FIG. 8 is a view similar to FIG. 6 but showing a drive arrangement having three endless cables.

FIGS. 6, 7 and 8 show schematically three cable drive arrangements for driving a headlamp wiper system according to the present invention. In each case the drive arrangements are shown as applied to four headlamps 10a, 10b, 10c, 10d. The headlamp 10a, is paired with the headlamp 10c located forwardly of the headlamp 10a. The headlamps 10b, 10d are similarly paired. The annular drive pulleys for the headlamps are numbered 17a – d to correspond with their respective headlamps.

Figure 9:
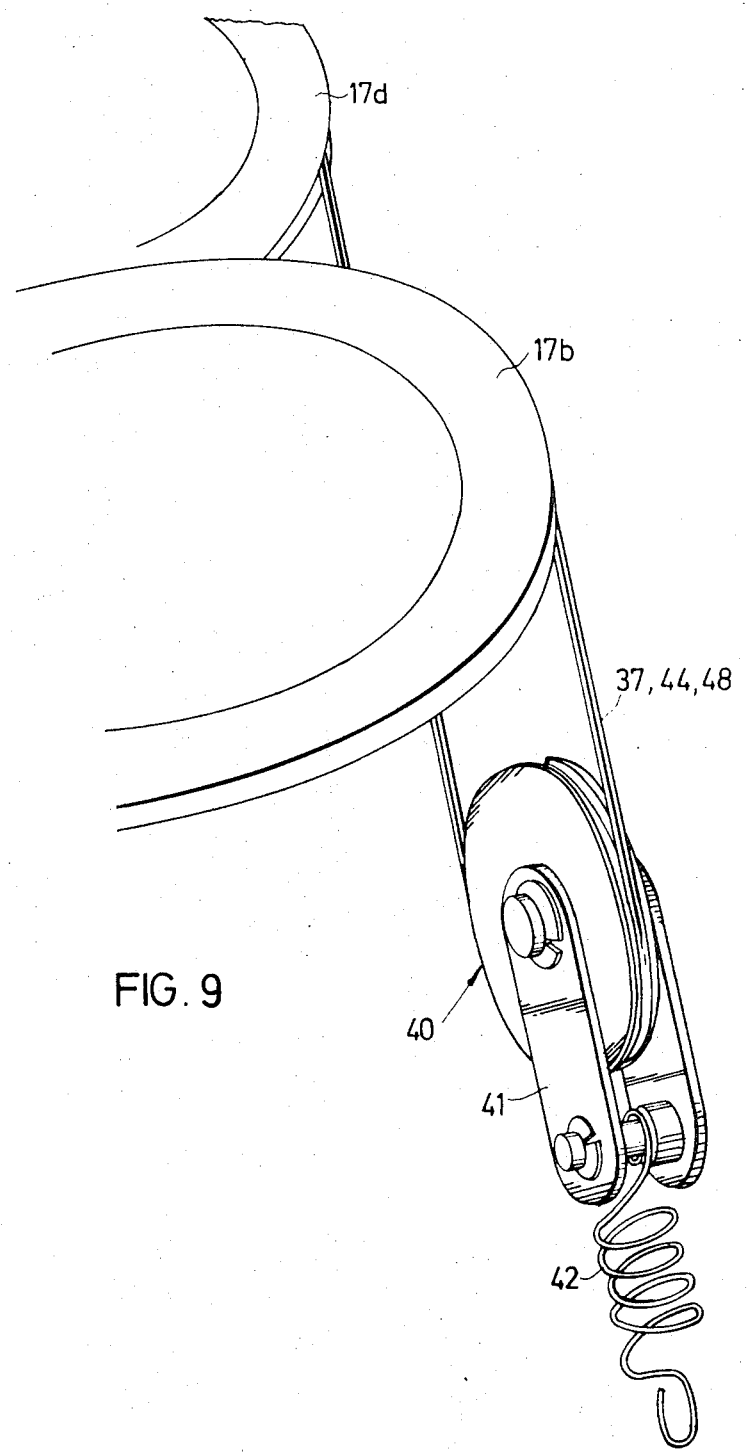
FIG. 9 is a perspective view to a larger scale of a tension idler pulley for use in any of the drive arrangements of FIGS. 6 – 8.

The arrangement shown in FIG. 6 utilizes a single endless drive cable 37. This cable is wrapped round a driven pulley 38 in line with the headlamps 10a, 10b and from there the cables passes (following the arrows) halfway around the annular drive pulley 17a, then passes to an idler pulley 39 located adjacent the pair headlamps 17a, 17c, which pulley guides the cable 37 so that it has a smooth run from the annular pulley 17a to the annular pulley 17c. From the annular pulley 17c the cable passes to the pulley 17d of headlamp 10d. The cable passes halfway around the annular pulley 17d and then halfway around an idler pulley 40 adjacent the paired headlamps 10d, 10b. The idler pulley 40 guides the cable so that it has a smooth run from the annular pulley 17d to the annular pulley 17b. From annular pulley 17b the cable returns to the driven pulley 38. The headlamps 10c and 10d are spaced forwardly of their fellows 10a and 10b by a distance a shown in FIG. 6. The idler pulleys 39 and 40 each has a diameter substantially equal to the distance a between the paired headlamp, thus ensuring a smooth run for the endless cable 37. The idler pulley 40 as best seen in FIG. 9 is mounted in a forked support 41 which is pivotally supported at one end of a tension spring 42 whose other end is secured to a convenient mounting point on the motor vehicle. The mounting of the spring on the motor vehicle is not shown in the drawings. Reference numerals 44, 48 in FIG. 9 refer to the respective endless cables of the arrangements in FIGS. 7 and 8, now to be described. The idler pulley 40 constitutes a tension pulley for the endless cable 37.

In the arrangement shown in FIG. 7 the headlamps are disposed as in FIG. 6. However, in this arrangement two endless cables 43, 44 are utilized. Both cables are wrapped halfway round a common driven pulley 45. Cable 43 passes around pulleys 17a, 17c and associated idler pulley 40, which also tensions the cable, and back to the driven pulley 45. Cable 44 passes in similar fashion around the annular pulleys 17d, 17b and associated tension idler pulley 40 back to the common driven pulley 45. This arrangement has the advantage that if one cable breaks the other can still drive the wipers of one pair of headlamps.

The arrangement shown in FIG. 8 utilizes three endless cables. One cable 46 passes from a common driven pulley 48 around two idler pulleys 50, 51 and back to the common driven pulley 48. An endless cable 47 passes from idler pulley 50 around annular pulley 17a idler pulley 39, annular pulley 17c and back to idler pulley 50. Cable 48 passes from idler pulley 51 around annular pulley 17b, tension idler pulley 40, annular pulley 17d and back to idler pulley 51. The idler pulleys 50 and 51 are mounted so that they can move along a common axis in response to tension forces exerted on them by the cables 47, 48. These tension forces originate in the driving of the cables and the presence of one tension idler pulley 40. Tension on cable 48 from the spring-mounting of the pulley 40 pulls the pulley 51 along its common axis with pulley 50 and so transmits a pull through cable 46 to pulley 50 which is also pulled in the same direction as pulley 51. Cable 47 is thus tensioned and resists the pull. In this way the cables can be evenly tensioned by the use of one tension idler pulley only.

Figure 10:
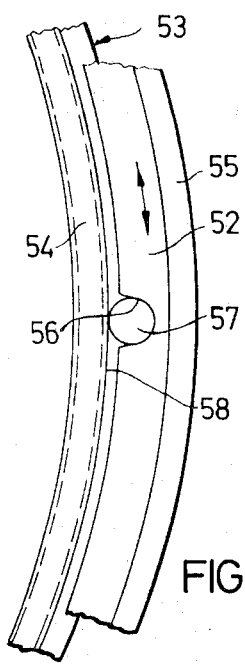
FIG. 10 is an elevation of part of a headlamp with a wiper system according to the invention and showing one form of anti-friction bearing means for supporting an annular drive pulley.

In order to ensure easy and smooth rotation of the annular pulleys anti-friction bearing means are utilized. FIG. 10 shows a part of a retainer 53 for an annular pulley 52 which preferably is like the pulleys 17, 17a – d. The annular pulley 52 has an outer peripheral groove 55 for receiving an endless cable (not shown). On its inner periphery the annular pulley 52 has cavities 56 (only one of which is shown) and anti-friction balls or rollers 57 are disposed in these cavities in contact with the annular pulley and an opposed face 58 of the retainer 53.

Figure 11:
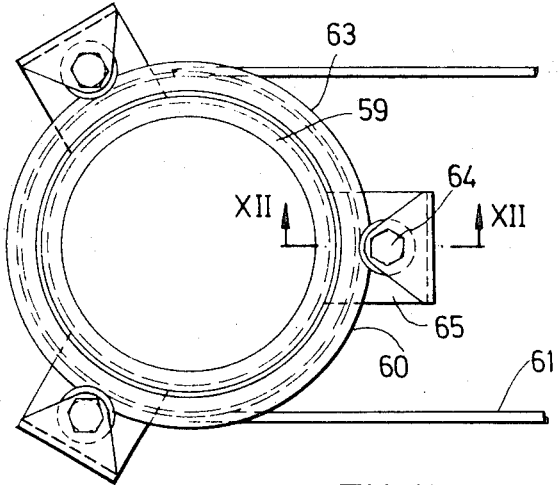
FIG. 11 shows schematically part of a headlamp wiper system according to the invention having a retainer ring with outwardly extending apertured fastener receiving portions.
Figure 12:
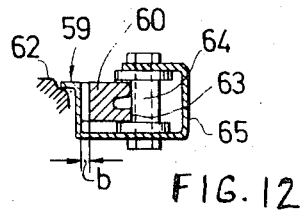
FIG. 12 is a view on the line XII—XII of FIG. 11 showing an anti-friction bearing means.

In FIGS. 11 and 12 an alternative arrangement of anti-friction bearing means is shown. In this arrangement a retainer 59 has an annular pulley 60 around it, driven by an endless belt 61 (part only of which is shown). A headlamp shown in FIG. 11 is shown in part in FIG. 12 and is denoted there by reference numeral 62. The retainer 59 has three outwardly extending apertured fastener portions 65 spaced equally from one another around the periphery of the retainer 59. These portions straddle the annular pulley 60, and each portion constitutes a housing for an anti-friction bearing roller element 64 which is mounted for rotation in the portion and is engageable with the outer periphery of the annular pulley 60. A clearance b (FIG. 12) is provided between the inner periphery 66 of the annular pulley 60 and the opposed face of the retainer 59.

Figure 13:
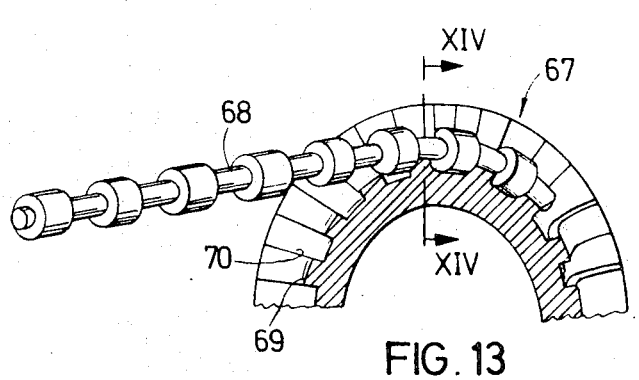
FIG. 13 is a perspective view of part of an annular drive pulley with a toothed rim and an associated cogged drive cable; and, FIG. 14 is a section on the line XIV—XIV of FIG. 13.
Figure 14:
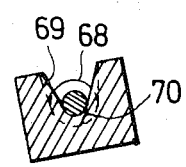

FIGS. 13 and 15 illustrate part of an annular pulley 67 and an associated endless cable 68. In this case the pulley 67 has a toothed periphery formed by making slots 70 in the groove 69 around the outer periphery of the pulley 67. The endless cable 68 has circular cross-section cogs or protuberances which are shaped to engage one by one in the slots of the toothed periphery of the pulley 67.

Conveniently in all the arrangements described above the drive to the headlamp wiper system is by way of an electric motor drivingly engageable with the appropriate driven pulley. Other sources of drive power could be used where feasible or where design considerations necessitate a non-electric drive source.

The position of the driven pulleys and the idler pulleys can be varied to suit particular installation requirements so long as the endless cable has a smooth kink-free run. In the case of the wiper arrangement shown and described with reference to FIGS. 1 and 2 the annular pulley or pulleys can be rotated clockwise or counterclockwise.

Conveniently a washer nozzle is associated with each headlamp and is connected to a reservoir to supply water to the headlamp lenses upon actuation of the wiper system.

We claim:

1. A headlamp wiper system for wiping headlamps having annular rims of an automotive vehicle comprising: an annular retainer means surrounding the rims of the headlamps and in engagement therewith for securing the headlamps in housings on the vehicle, annular drive pulleys journelled in said retainer means for rotative movement circumferentially of said rims, a wiper attached to each of said drive pulleys and in contact engagement with one of said headlamps, anti-friction bearing means between said retainer means and said pulleys, said anti-friction bearing means including bearing elements in rolling contact with one of said retainer means and drive pulleys, and a drive means including endless cable means drivingly connected to said annular drive pulleys for rotating said pulleys when said drive means is energized, and tensioning means including a spring biased idler pulley for maintaining a tension on said endless cable means.

2. A headlamp wiper system as defined in claim 1 wherein said retainer means are substantially U-shaped, as viewed in cross section, to define a bottom and a pair of opposed sides, and wherein the bearing elements are carried by the pulleys and are in rolling engagement with the bottoms of the retainer means.

3. A headlamp wiper system as defined in claim 1 wherein the annular retainer means includes radially outwardly extending portions for rotatably supporting the bearing elements and in which the bearing elements are in rolling engagement with the outer peripheries of the drive pulleys.

4. A headlamp wiper system as defined in claim 1 wherein the drive means includes at least two other idler pulleys over which the endless cable means passes and wherein said other idler pulleys guide the endless cable means as it passes from one headlamp to another headlamp.

5. The headlamp wiper system as defined in claim 1 and wherein the drive means includes a common drive pulley, a first endless cable drivingly connecting said common drive pulley with two other idler pulleys, and two endless cables each drivingly connecting one of said two other idler pulleys with one of the annular drive pulleys adjacent the headlamps.

6. A headlamp wiper system as defined in claim 1 in which each wiper conforms to the shape of the headlamp lens, extends diametrically across the lens, and is secured at each end to one of the drive pulleys.

7. A headlamp wiper system as defined in claim 1 in which each wiper is hingedly connected to one of the drive pulleys at one end, first and second angularly spaced stop means on each of the drive pulleys adjacent the hinge means, said annular drive pulleys when rotated in one direction causing said wipers to be moved from a park position adjacent the drive pulleys toward a wiping position in which it extends generally radially of the lens until it engages the first stop means, said annular drive pulley when rotated in the opposite direction causing the wipers to be moved from their wiping position towards their park position until they engage the second stop means.

* * * * *